(12) United States Patent
Rhodes et al.

(10) Patent No.: US 7,645,433 B2
(45) Date of Patent: Jan. 12, 2010

(54) OPTIMIZATION OF REFLUX ACCUMULATOR START-UP IN AMINE REGENERATION SYSTEM

(75) Inventors: Roy Wade Rhodes, Bryan, TX (US); Quenten Zane Rhodes, II, College Station, TX (US)

(73) Assignee: Newpoint Gas Services, Inc., College Station, TX (US)

( * ) Notice: Subject to any disclaimer, the term of this patent is extended or adjusted under 35 U.S.C. 154(b) by 310 days.

(21) Appl. No.: 11/756,226

(22) Filed: May 31, 2007

(65) Prior Publication Data

US 2007/0286784 A1 Dec. 13, 2007

Related U.S. Application Data

(60) Provisional application No. 60/812,052, filed on Jun. 9, 2006.

(51) Int. Cl.
*B01D 53/14* (2006.01)
*B01D 53/18* (2006.01)
*B01J 8/00* (2006.01)
*B01J 10/00* (2006.01)
*B01J 38/02* (2006.01)
*B01J 38/06* (2006.01)

(52) U.S. Cl. .................. 423/228; 422/187; 502/55; 502/56; 48/127.3; 48/127.5

(58) Field of Classification Search ............... 502/55, 502/56; 423/228; 422/187; 48/127.3, 127.5
See application file for complete search history.

(56) References Cited

U.S. PATENT DOCUMENTS

| 3,565,573 A | 2/1971 | Thirkell |
|---|---|---|
| 3,773,895 A | 11/1973 | Thirkell |
| 3,829,521 A | 8/1974 | Green et al. |
| 4,106,916 A | 8/1978 | Tuckett |
| 4,152,217 A | 5/1979 | Eisenberg et al. |
| 4,406,868 A | 9/1983 | Carter |
| 4,461,749 A | 7/1984 | Thorn |
| 4,511,381 A | 4/1985 | Mehra |
| 4,798,910 A | 1/1989 | Herrin |
| 5,089,034 A | 2/1992 | Markovs |
| 5,994,147 A | 11/1999 | Rodriguez |
| 6,071,484 A | 6/2000 | Dingman et al. |
| 6,183,540 B1 | 2/2001 | Thonsgaard |
| 6,531,103 B1 | 3/2003 | Hakka |
| 2002/0007733 A1 | 1/2002 | Morrow |
| 2003/0005823 A1 | 1/2003 | Le Blanc |
| 2004/0060334 A1 | 4/2004 | Palmer |
| 2004/0115109 A1 | 6/2004 | Minkkinen |

FOREIGN PATENT DOCUMENTS

| GB | 1096851 | 12/1967 |
|---|---|---|
| WO | WO9707082 | 2/1997 |
| WO | WO2006118795 | 11/2006 |

OTHER PUBLICATIONS

S. Ebenezer, Optimization of Amine Base CO2 Removal Process—Removal of carbon dioxide from natural gas for LNG production, Semester Project Work, Institute of Petroleum Technology, Norwegian University of Science and Technology, Trondheim, Norway, NTNU Innovation and Creativity, pp. 1-67 (Dec. 2005).

*Primary Examiner*—Timothy C Vanoy
*Assistant Examiner*—Daniel Berns
(74) *Attorney, Agent, or Firm*—McHale & Slavin, P.A.

(57) ABSTRACT

A system for optimizing start-up of an amine regeneration system comprising a rich/lean heat exchanger, a still, a reflux condenser, a reflux accumulator, a pump, a reboiler, and a reflux accumulator fill line assembly.

2 Claims, 2 Drawing Sheets

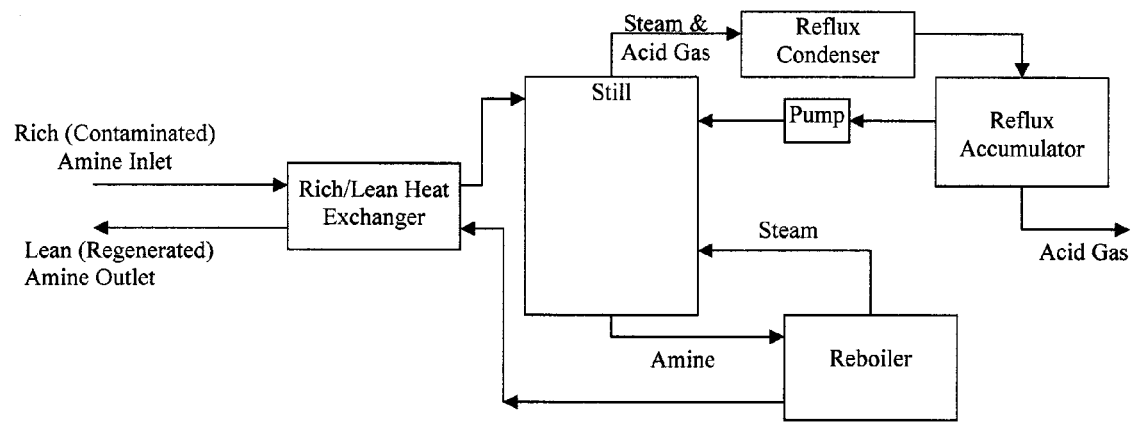
Figure 2 - Prior Art

OPTIMIZATION OF REFLUX ACCUMULATOR START-UP IN AMINE REGENERATION SYSTEM

CROSS-REFERENCE TO RELATED APPLICATIONS

This application claims benefit of the filing date of Provisional Patent Application 60/812,052, file Jun. 9, 2006, the contents of which are herein incorporated by reference.

FIELD OF THE INVENTION

This invention relates to the regeneration of amine used in the processing of natural gas. The invention particularly relates to novel component configurations to increase ease of startup and operations for the amine regeneration system; and most particularly to the optimization of reflux accumulator operation by incorporation of direct injection of amine solution.

BACKGROUND OF THE INVENTION

Acid gas removal from gas streams, particularly removal of hydrogen sulfide and carbon dioxide from gas streams formed in refinery process units, synthesis gas production plants and oil and gas production facilities, is necessary to allow this gas to be used and/or sold into pipeline systems. The removal of sulfur compounds from these acid gasses or "sour gasses" is called "sweetening." Typically, acid gases are removed using an amine-based solvent to absorb the acid gas via various chemical reactions, resulting in the production of a rich amine solvent, which can then be regenerated using heat.

Hydrogen sulfide is a toxic gas that must generally be removed to extreme low concentrations (less than 0.25 grains of $H_2S$ per 100 standard cubic feet) prior to pipeline delivery. When mixed with free water it forms a weak acid that can cause corrosion.

Carbon dioxide is a non-toxic inert gas. Carbon dioxide, as such, is harmless in dry natural gas but when mixed with free water will form a weak acid and also cause corrosion. Inlet gas to cryogenic plants that contain concentrations of $CO_2$ in excess of 0.75 to 1.0 percent $CO_2$ may cause freezing problems. The $CO_2$ will freeze to a solid ice in a turbo expander plant demethanizer where it may plug lines and even plug the tower itself. Often flooding of the demethanizer results from carbon dioxide freezing within the tower. When the plant inlet gas contains concentrations of carbon dioxide too high to process, all of the gas may be treated or part of the gas may be separated into a side stream and treated by an amine plant. Principally all the carbon dioxide is removed in the amine plant. When the side stream is processed, and sufficient gas is treated, it is blended back with the untreated gas, thus yielding a carbon dioxide content of the blended stream which is low enough for processing. Carbon dioxide also lowers the heating value of the gas stream which is usually specified as 1000 BTU/scf.

There are generally two types of gas treating processes: (a) absorption and (b) adsorption. In absorption processes, the gas stream contacts a liquid that selectively removes acid gases. The most common absorption process is the amine process. The liquid absorbent is a mixture of water and a chemical amine, usually monoethanol-amine (MEA) or diethanolamine (DEA). Sometimes triethanol-amine (TEA), diglycolamine (DGA), and methyl-diethanolamine (MDEA), diisopropylamine, sulfanol and solutions of these, with special additives to improve efficiencies, are utilized.

Amines remove carbon dioxide and hydrogen sulfide by a chemical reaction that changes the chemical form of both the amine and the acid gases. The new chemical changes the acid gases to a liquid form which is separated from the acid-free gas or sweetened gas. The chemical reaction between amine (called lean amine at the start of the process) and acid gases gives off heat when the reaction takes place. The sweet residue gas flows out the top of a contactor or absorber and the reacted amine (also called rich amine) flows out the bottom and is generally higher in temperature than the inlets. Lean amine is regenerated by reducing the pressure and adding heat to the rich amine.

The "Fifth Edition Gas Purification" by Arthur Kohl and Richard Nielsen (Gulf Publishing, 1960 to 1997) illustrates various processes for the purification of gases utilizing amine solvents and illustrates processes for regeneration of the amine solvents. Particularly preferred amine-based solvents include secondary and tertiary amines (e.g., diethanolamine [DEA], and/or methyldiethanolamine [MDEA]), which are generally more energy efficient than primary amines due to their lower heat of reaction and lower energy requirements for regeneration. Alternative amine solvents may further include monoethanolamine [MEA], diglycolamine [DGA], triethanolamine [TEA], diisopropylamine, and various combinations thereof, along with one or more additives.

The effectiveness of a particular amine solvent to absorb acid gases to meet the treated gas specification typically depends on the residual acid gas content in the lean amine, which in turn is a function of the particular regeneration method and conditions. The lower the acid gas content in the lean amine, the more effective the acid gas absorption process. Therefore, a variety of approaches have been undertaken to improve the current acid gas absorption and regeneration processes.

While numerous prior art processes and systems for acid gas absorption and solvent regeneration are known in the art, many suffer from one or more disadvantages or inefficiencies.

DESCRIPTION OF THE PRIOR ART

U.S. Pat. No. 4,152,217 to Eisenberg et al teaches an amine regeneration system which utilizes a split rich amine stream wherein one stream is routed directly to the top of an amine regenerator column and the second stream is routed to a heat exchanger where it is heated en route to an intermediate point of the regenerator column. The spent amine stream which is passed without prior heating directly to the top of the regenerator column is heated by condensing steam in the column which would normally escape therefrom, thereby reducing the amount of "saturation" steam which is lost from the system, thereby reducing the overall energy requirements for the system.

U.S. Pat. No. 4,461,749 to Thorn is directed to a method of processing acid gases wherein makeup water is distilled internally in an amine gas treating unit by adding it to the reclaimer used to process a slipstream of lean amine from the stripper.

U.S. Pat. No. 4,798,910 to Herrin teaches a method for amine regeneration wherein a rich amine out of a first heat exchanger is temperature controlled prior to transfer to a second heat exchanger. At least a portion of the hot overhead gasses exiting from a stripping still are transferred to the second heat exchanger. Temperature controlled heated rich amine liquid passes through the second exchanger and contacts the hot overhead gasses. The rich amine liquid is increased in higher temperature thereby and then is transferred to yet a third exchanger and finally to the stripping still for regeneration of lean amine. The reduced temperature overhead gasses are transferred to the reflux condenser for final cooling.

U.S. Pat. No. 6,071,484 to Dingman, et al. describe a method to produce an ultra lean amine using an ion exchange bed to remove the residual acid gases in the lean amine.

U.S. Pat. No. 4,798,910 to Herrin, teaches the use of an additional heat exchanger to heat the rich amine solvent using a portion of the heat content in the regenerator overhead gases. This method reduces overhead condenser duty to some degree, however reboiler duty remains largely unaffected, as the amine regeneration process is more strongly dependent on the stripping steam supplied at the bottom of the regenerator.

U.S. Pat. No. 3,565,573 to Thirkell teaches a process in which acid gas is treated in a dual-zone absorber to provide a rich solvent that is regenerated in conventional manner.

U.S. Pat. No. 3,829,521 to Green et al, similarly describe a configuration in which a pre-stripper and a stripper operate in series to remove acid gas from two gas streams.

These references fail to address the start-up problems and process inefficiencies of amine regeneration plants which are the subject of the instant invention. The improved configurations and methods for solvent regeneration disclosed herein therefore solve a long-felt need in the art.

SUMMARY OF THE INVENTION

In order for natural gas, which is useful in such varied applications as home heating and cooking, industrial heating, and the generation of electricity, to be utilized, hydrogen sulfide ($H_2S$), carbon dioxide ($CO_2$), and water vapor must be removed.

Amine plants are typically employed for the removal of the first two contaminants listed (hereto referred to as "acid gas"). In an amine plant, an amine based solvent is brought in contact with the natural gas stream. The amine adsorbs the acid gas and then the amine is regenerated, which means that the acid gas in the amine is removed so the amine can be reused.

This patent is directed toward improvements in the amine regeneration process. The method for regeneration utilizes a reboiler to create steam that comes into contact with the amine. The steam has two purposes: to provide heat that allows the endothermic de-adsorption of the acid gas to occur and to reduce the partial pressure of the acid gas in the vessel. This reduction in partial pressure allows the amine to be regenerated at much higher purities than would otherwise be possible. The amine is then cooled and reused to treat the natural gas.

In accordance with the present invention, an improved process for amine regeneration is provided via a system including a rich/lean heat exchanger, a still, a reflux condenser, a reflux accumulator, a pump, and a reboiler, wherein the improvement comprises the provision of a reflux accumulator fill line, and associated flow control valving, so as to provide direct injection of amine solution, thereby enabling an operator to instantly set the liquid level in the reflux accumulator, to enhance start-up efficiency.

Accordingly, it is a primary objective of the instant invention to allow the direct injection of amine solution to allow setting of the liquid level in the reflux accumulator.

It is a further objective of the instant invention to reduce the operations cost concomitant with the necessity of having to wait for the accumulation of reflux in the accumulator to set the liquid level therein.

It is yet another objective of the instant invention to reduce downtime by elimination of the need to wait for the accumulation of reflux in the accumulator to set the level.

It is a still further objective of the invention to reduce the time required to achieve system steady-state and allow for unattended operation.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 2 shows a similar prior art process absent the reflux accumulator fill line utility.

DETAILED DESCRIPTION OF THE INVENTION

Figure 1:
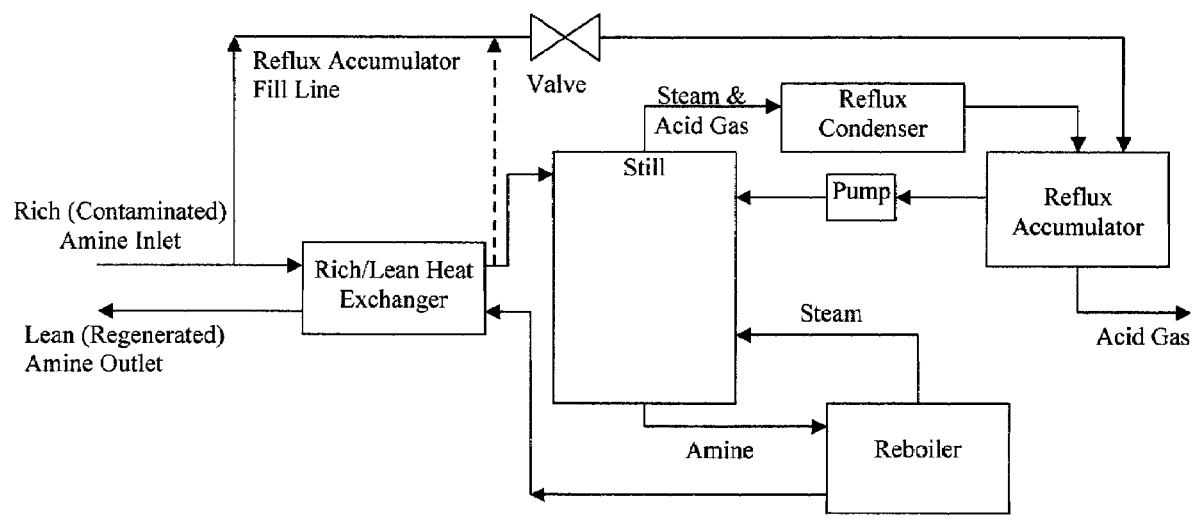
FIG. 1 shows the flow of contaminated amine through its separation into clean amine and acid gas, and illustrates the reflux accumulator fill line in accordance with the present invention.

The present invention focuses on the lean amine regeneration process. Typically, as illustrated in FIG. 2, the solution regeneration generally takes place in a low pressure still with a reboiler at the bottom to furnish heat to the solution. The still is generally a bubble tower containing either trays or packing. The rich amine liquid containing the sour gasses ($CO_2$ and $H_2S$) is injected into the still near the top and flows down the tower while steam generated in the reboiler flows up the tower countercurrent to the descending rich amine. The steam aids in "stripping" the sour gasses from the rich amine liquid and sends them back up the tower and out the top of the tower. The heat added to the still reboiler increases the temperature of the amine somewhat, but most of the heat goes into generating steam which, in turn, flows into and up the still. This heat added or inputted into the reboiler must be furnished from an outside source such as steam from another process, hot oil or hot glycol circulated through the reboiler, or fuel directly fired into the reboiler. When sour gasses pass out the top of the still, a large amount of steam also goes out with the gas. This overhead steam and gas stream (called overhead) is generally higher in temperature than the feed to the top of the still. In the normal amine unit the gasses and steam which flow from the top of the still flow to a condenser (called a reflux condenser) where the sour gasses are cooled to near ambient temperatures and most of the steam condenses into water. This water is separated via the reflux accumulator, which operates at a steady state liquid level, once the plant has reached a degree of operational equilibrium. Attaining this steady-state operation often requires an extended start-up regimen, since it is necessary to wait for sufficient water to accumulate within the reflux accumulator to provide the desired liquid level.

A preferred method for optimizing start-up of an amine regeneration system is set forth in FIG. 1. This method includes the steps of:

(a) providing fluid communication between a rich amine input stream and a reflux accumulator whereby a liquid level within the reflux accumulator is achieved by supplementation with the input rich amine stream;

(b) heating the input rich amine stream by passage thereof through a rich/lean heat exchanger to form a heated rich amine stream;

(c) releasing acid gas components from the heated rich amine stream by passage of the heated rich amine stream into a still wherein the heated rich amine stream is subjected to an initial steam contact thereby causing it to release acid gas components and form a lean amine stream;

(d) feeding the resultant lean amine stream to a reboiler where it is heated to produce additional steam;

(e) introducing the additional steam to the still whereby it contacts the heated rich amine stream and exits the still as an overhead admixture including the acid gas components;

(f) recovering water from the overhead stream by passage thereof through a reflux condenser whereby acid gas components exit to waste;

(g) storing the recovered water in a reflux accumulator for subsequent pumping to the still; and (h) passing the resultant lean amine stream from the reboiler to the rich/lean heat exchanger wherein it is cooled and exits the system fully regenerated.

The novelty of the process and apparatus resides in the use of the reflux accumulator fill line to set the initial level in the reflux accumulator. The amine plants control system protects the pump from running without fluid. The "level gauge" needs to sense a liquid level in order for the amine plant to continue running. During initial startup of the plant there is not any condensed water in the accumulator, thereby causing a plant fault. In existing plants, this fault must be manually overridden by an operator and the operator must remain with the plant until the condensed water accumulates to the appropriate level, which can take up to a few hours. Simply adding water to the accumulator is not a viable option since such addition will unacceptably change the concentration of water in the system. In the instant design a reflux accumulator pressurization assembly comprised of an amine line and associated valving, provides a fluidic connection between the rich amine and the reflux accumulator. As shown in FIG. 1, the take-off of the rich amine stream for forwarding to the reflux accumulator may be before or after the rich/lean heat exchanger (note dashed line after rich/lean heat exchanger). The valve can be opened to enable setting of a liquid level within the reflux accumulator, as desired, thereby optimizing start-up and greatly saving time and effort.

From the description above, a number of advantages of the amine regeneration facility become evident:

(a) the cost of operations due to waiting for the accumulation of reflux in the accumulator to set the level is reduced by allowing the operator to set the level in a few minutes rather than a few hours; and (b) the amount of downtime is reduced by not waiting on the accumulation of reflux in the accumulator to set the level.

Operation—FIG. 1

The contaminated amine is introduced into the rich/lean heat exchanger causing the rich amine to be heated. The rich amine is then introduced into the still where it comes in contact with steam as it goes down through the still. The amine releases the acid gas components which exit the still with the steam and they are carried into the reflux condenser. The steam condenses in the reflux condenser, and then the water stream enters the reflux accumulator where the acid gas exits the system. The condensed water is stored in the reflux accumulator until it is pumped back into the still. The amine exits the still and enters the reboiler where it is heated to release steam which is fed into the still. The fully regenerated amine is passed into the rich/lean heat exchanger where it is cooled and exits the system as fully regenerated amine. The reflux condenser level is set for startup using the reflux accumulator fill line and valve assembly as shown.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method for optimizing start-up of an amine regeneration system comprising:

(a) providing fluid communication between a rich amine input stream and a reflux accumulator whereby a liquid level within said reflux accumulator is achieved by supplementation with said input rich amine stream;

(b) heating said input rich amine stream by passage thereof through a rich/lean heat exchanger to form a heated rich amine stream;

(c) releasing acid gas components from said heated rich amine stream by passage of said heated rich amine stream into a still wherein said heated rich amine stream is subjected to an initial steam contact thereby causing it to release acid gas components and form a lean amine stream;

(d) feeding said resultant lean amine stream to a reboiler where it is heated to produce additional steam;

(e) introducing said additional steam to said still whereby it contacts said heated rich amine stream and exits said still as an overhead admixture including said acid gas components;

(f) recovering water from said overhead admixture by passage thereof through a reflux condenser whereby acid gas components exit to waste;

(g) storing said recovered water in a reflux accumulator for subsequent pumping to said still; and (h) passing said lean amine stream from said reboiler to said rich/lean heat exchanger wherein it is cooled and exits said system fully regenerated.

2. An optimized amine regeneration system comprising:

(a) a reflux accumulator pressurization assembly for controlling fluid communication between a rich amine input stream and a reflux accumulator, whereby a particular liquid level within said reflux accumulator is achieved by supplementation with said input rich amine stream, said assembly including an amine line and a valve upstream from the inlet of the rich amine input stream to the reflux accumulator;

(b) a rich/lean heat exchanger for heating said input rich amine stream to form a heated rich amine stream;

(c) a still wherein said heated rich amine stream is subjected to an initial steam contact thereby causing it to release acid gas components and form a lean amine stream;

(d) a reboiler for heating said lean amine stream to produce additional steam;

(e) a line for introducing said additional steam to said still whereby it contacts said heated rich amine stream and exits said still as an overhead admixture including said acid gas components;

(f) a reflux condenser for recovering water from said overhead admixture for storage and separation of said acid gas components to waste;

(g) a reflux accumulator for storing said recovered water and subsequently pumping to said still; and (h) a line for passing said lean amine stream from said reboiler to said rich/lean heat exchanger wherein it is cooled and exits said system fully regenerated.

* * * * *